S. S. ECCLESTON.
STEAM COOKER.
APPLICATION FILED MAR. 16, 1910.
992,119.
Patented May 9, 1911.
2 SHEETS—SHEET 1.
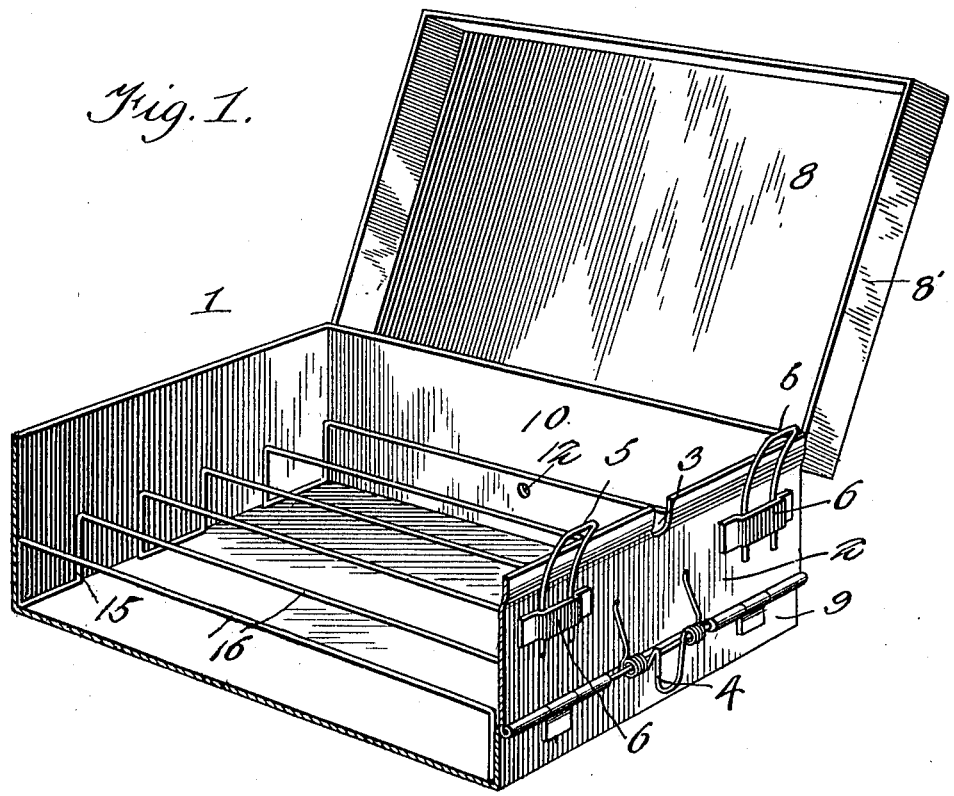
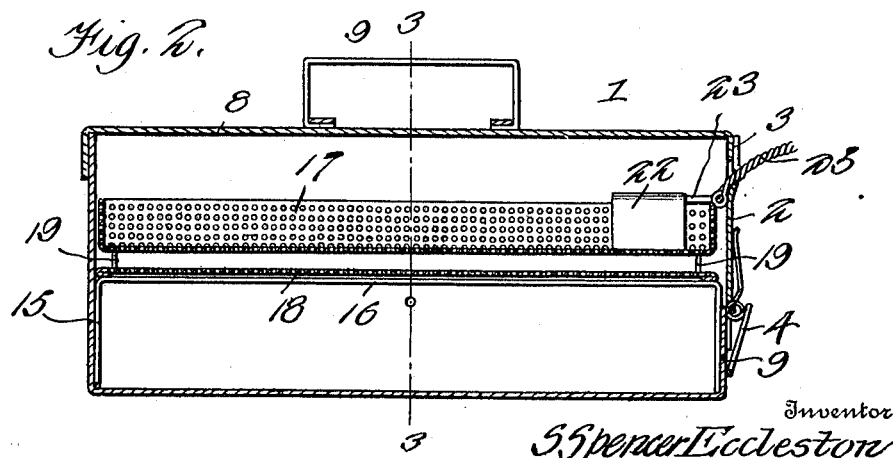
Witnesses
Inventor
S Spencer Eccleston
By Victor J. Evans
Attorney S. S. ECCLESTON.
STEAM COOKER.
APPLICATION FILED MAR. 16, 1910.
992,119.
Patented May 9, 1911.
2 SHEETS—SHEET 2.
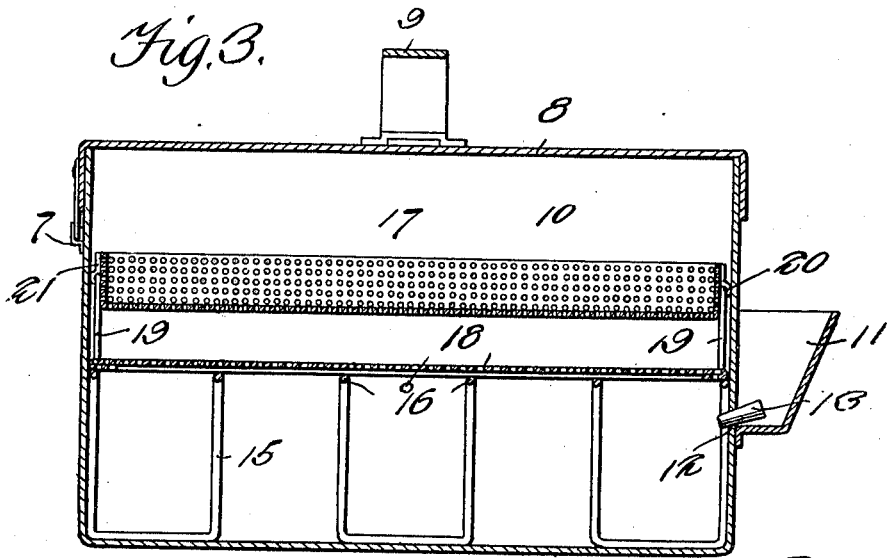
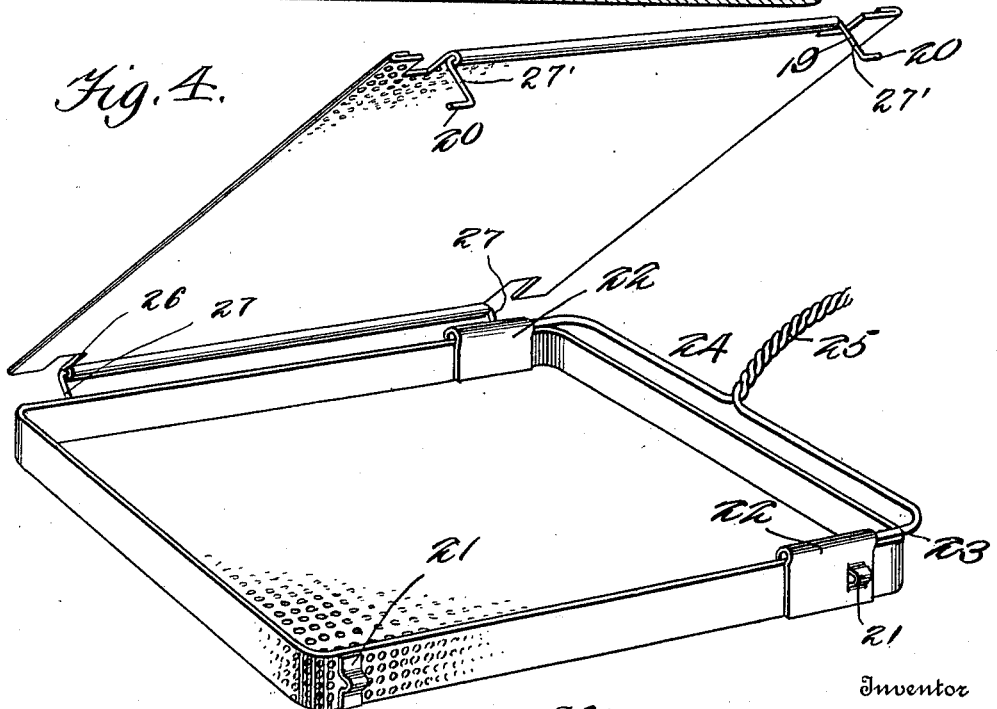
Witnesses
Inventor
S Spencer Eccleston
By Victor J. Evans
Attorney

UNITED STATES PATENT OFFICE.

S SPENCER ECCLESTON, OF SYRACUSE, NEW YORK.

STEAM-COOKER.

992,119. Specification of Letters Patent. Patented May 9, 1911.

Application filed March 16, 1910. Serial No. 549,656.

*To all whom it may concern:*

Be it known that I, S SPENCER ECCLESTON, a citizen of the United States of America, residing at Syracuse, in the county of Onondaga and State of New York, have invented new and useful Improvements in Steam-Cookers, of which the following is a specification.

This invention relates to steam cookers, and has for an object to provide an article of this character embodying a receptacle formed to contain a body of water, and a support disposed above the body of water and supporting a removable foraminous member upon which the food stuffs may be steamed.

In the drawings, forming a portion of this specification and in which like numerals of reference indicate similar parts in the several views:—Figure 1 is a sectional perspective view of my improved cooker, the cover being in an open position. Fig. 2 is a detail longitudinal section taken through the cooker. Fig. 3 is a transverse section taken on the line 3—3 of Fig. 2. Fig. 4 is a detail perspective view of the foraminous tray.

My improved steam cooker comprises a receptacle 1 which in this instance is of rectangular form. The receptacle is provided at one end with a spring tension door 2 which is formed at its upper edge portion with a vertical notch 3. The door 2 is normally closed against the side walls of the receptacle through the tension of the spring 4 which may be of any approved well known construction. Substantially U-shaped handles 5 are removably engaged in loops 6 on the door 2 and they may be operated to move the door to an open position against the tension of the spring 4. The front wall of the receptacle is provided with a keeper 7 with which is adapted to be engaged a hook or equivalent fastening means upon the hinged closure 8 which latter is provided with a handle 9 whereby the cooker can be conveniently moved from place to place as will be understood. The door 2 of the receptacle is hinged in any suitable well known manner to the portion 9 of the receptacle which extends upwardly from the bottom. The rear wall 10 is provided with a funnel or mouth-forming member 11 which communicates with a passage 12 in the rear wall. This construction is such that water may be poured into the receptacle by way of the said funnel or mouth 11, a plug 13 being adapted for insertion in the opening 12 to prevent the escape of steam when the cooker is in use.

A suitable wire frame or the like 15 is removably mounted in the receptacle and it is formed to provide a plurality of supporting feet which rest upon the bottom of the receptacle. This frame is provided with a plurality of longitudinally extending spaced supports 16 which are disposed in suitable spaced relation to the bottom of the receptacle for a purpose to be hereinafter described. A foraminous tray 17 of a construction conforming in configuration with the receptacle is supported upon the frame hereinbefore described and as shown, the said tray is provided with a foraminous cover 18. This cover is of a construction to permit it to be folded beneath the tray and it is provided with a pivoted member 19 which is formed with hooked extremities 20 which are adapted for locking engagement in keepers 21 at one side of the tray. Adjacent to one end of the tray, its side walls are provided with socket members 22 in which the arms 23 of a handle member 24 are fitted. This handle member is provided with a shank 25 which extends through the notch 3 in the door 2 so that it may be conveniently grasped by the operator when it is desired to remove the cooked vegetables or the like from the receptacle.

The foraminous tray hereinbefore described may be used as a sterilizing pan by means of which dental instruments or the like may be conveniently and effectively sterilized. If desired this tray may be also used as a corn popper and when so used its foraminous cover is moved into its closed position.

It may be stated that the flange 8' of the closure 8 partly covers the opening 3 in the door 2 when the said closure 8 is in a closed position to prevent a great waste of steam. Upon reference to Fig. 3 of the drawings it will be seen that, incident to the provision of the cover 18 on the foraminous tray 17 and the manner of connecting the tray with the cover, the latter when moved to a position to lie beneath the bottom of the tray is spaced therefrom. In view of this construction I provide for a perfect circulation of the steam around the pan.

The hinge member 26 which connects the cover with one side of the tray is constructed to form the legs 27. These legs are similar in construction with the legs 27' formed by the hooked ends of the pivoted member 19. When the cover is turned to lie beneath the tray and the hooked ends 20 of the member 19 are engaged in the keepers 21, the legs 27 and 27', owing to the fact that they are each of a greater length than the height of the tray, will operate to hold the cover in spaced relation to the bottom of the tray.

I claim:—

In a steam cooker, a receptacle having a support therein, a foraminous tray removably mounted in the receptacle, a closure of foraminous material on the tray, a hinge-forming member connecting the closure with the tray at one side thereof and formed at its ends to provide legs, each leg being of a length greater than the height of the tray, a pivotally mounted member at the opposite edge of the closure, keepers secured to one side of the tray and arranged one adjacent each end thereof, the said pivoted second named member having legs at the ends thereof and formed at its extremity to provide hooks for engagement in the said keepers when the closure is turned to lie beneath the tray, the said first legs and the said second legs being coextensive in length and operating to hold the said closure spaced from the bottom of the tray when the closure is moved to underlie the tray.

In testimony whereof I affix my signature in presence of two witnesses.

S SPENCER ECCLESTON.

Witnesses:
MICHAEL BOLAND,
HARRY STINSON.

---

Copies of this patent may be obtained for five cents each, by addressing the "Commissioner of Patents Washington, D. C."